(12) United States Patent
Weber et al.

(10) Patent No.: US 6,213,426 B1
(45) Date of Patent: Apr. 10, 2001

(54) MONOLITHIC STRUCTURE WITH REDUNDANT LOAD PATHS

(75) Inventors: Gary R. Weber, Kent; Frederick John Feiertag, Seatac; Tyre Glenn Boss, Renton; Michael J. Reberg, Seattle; Matthew L. Anderson, Carnation; Kelly William Meloy, Auburn, all of WA (US); Genji Mizushima, Gifu (JP); Takeshi Kawase, Kirkland, WA (US); Ronald Hitzeman, Chaska, MN (US); Simon R. Walter, Richmond (AU)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/351,044

(22) Filed: Jul. 9, 1999

(51) Int. Cl.⁷ ........................................................ B64C 1/10
(52) U.S. Cl. ...................................... 244/117 R; 244/119
(58) Field of Search ................................ 244/117 R, 119, 244/121, 118.5, 129.1, 132

(56) References Cited

U.S. PATENT DOCUMENTS

| | | | |
|---|---|---|---|
| 1,492,952 | * | 5/1924 | Bahl . |
| 1,637,871 | * | 8/1927 | Nosan . |
| 2,679,467 | * | 5/1954 | Sherts . |
| 2,877,970 | * | 3/1959 | Albertine et al. . |
| 3,567,162 | * | 3/1971 | Lea . |
| 4,033,247 | | 7/1977 | Murphy . |
| 4,049,221 | | 9/1977 | Fountain . |
| 4,089,140 | * | 5/1978 | McIntyre et al. . |
| 4,269,376 | | 5/1981 | Haux et al. . |
| 4,296,869 | * | 10/1981 | Jawad . |
| 4,310,132 | * | 1/1982 | Robinson et al. . |
| 4,593,870 | * | 6/1986 | Cronkhite et al. . |
| 4,728,059 | | 3/1988 | Stephen et al. . |
| 5,024,399 | | 6/1991 | Barquet et al. . |
| 5,062,589 | | 11/1991 | Roth et al. . |
| 5,143,276 | | 9/1992 | Mansbridge et al. . |
| 5,262,220 | | 11/1993 | Spriggs et al. . |
| 5,893,534 | * | 4/1999 | Watanabe . |

\* cited by examiner

*Primary Examiner*—Charles T. Jordan
*Assistant Examiner*—Tien Dinh
(74) *Attorney, Agent, or Firm*—Alston & Bird LLP

(57) ABSTRACT

A monolithic structure for use as a pressure bulkhead for an aircraft includes a first web, a redundant second web spaced from the first web, stiffeners disposed between and connecting the webs to each other, and first and second outer attachment rings respectively provided on the outer peripheries of the first and second webs for attaching the bulkhead to fuselage structure. One of the webs comprises a pressure web for supporting pressure loading, and the other web defines at least one aperture therethrough. The stiffeners are integrally fabricated along with at least one of the webs and associated attachment ring as a one-piece monolithic part.

16 Claims, 7 Drawing Sheets

MONOLITHIC STRUCTURE WITH REDUNDANT LOAD PATHS

FIELD OF THE INVENTION

The invention relates to load-bearing structures and, more particularly, to structures for use in aircraft such as pressure bulkheads, passenger doors, cargo doors, landing gear doors, and the like.

BACKGROUND OF THE INVENTION

Primary load-bearing structures in aircraft are typically fabricated from a number of discrete parts that are joined together, as by welding, riveting, or other processes, to form the desired structure. The transfer of loads from one part to adjoining parts within the assembly is determined by the joining techniques used, and considerable effort is often invested in analyzing such load transfers and designing the structure to optimize the load transfers. In particular, it is often desirable in the design of aircraft structures to provide a "fail safe" structure whereby if the primary load path fails because of failure of a part or of a juncture between two parts along the primary load path, there is at least one alternate load path capable of safely providing the requisite load limit capability of the structure. Fail safety is one means of demonstrating compliance with airworthiness standards per Federal Aviation Regulations section 25.571.

The cost of fabricating a load-bearing structure can potentially be reduced by employing monolithic fabricating techniques such that discrete parts are consolidated into a single integral structure, thereby eliminating the necessity of fabricating multiple parts and joining the parts together. Typically, when monolithic structures are employed, however, no effort is made to provide multiple or alternate load paths.

SUMMARY OF THE INVENTION

The present invention provides a load-bearing structure employing unique monolithic construction such that multiple load paths exist. The invention is particularly suitable when applied to the manufacture of aircraft structures such as pressure bulkheads, passenger doors, cargo doors, landing gear doors, and the like.

In accordance with a preferred embodiment of the invention, a load-bearing structure adapted to serve as a portion of a boundary enclosing a pressurized or evacuated space is provided having redundant load paths. The load-bearing structure comprises a first web, a first outer attachment structure attached to the outer periphery of the first web, a redundant second web spaced from the first web with inner surfaces of the webs facing each other, a second outer attachment structure attached to the outer periphery of the second web, and stiffeners disposed between the first and second webs and attached to the inner surfaces thereof. The stiffeners are fabricated with at least one of the webs and the attachment structure associated therewith as a monolithic part. The first and second outer attachment structures are adapted to affix the load-bearing structure to a further structure of the boundary enclosing the pressurized or evacuated space. Accordingly, the load-bearing structure defines multiple load paths from the webs to the further structure.

In accordance with a further preferred embodiment of the invention, the loadbearing structure for a pressurized space can prevent sudden depressurization of the space and consequent "blow out" of the structure in the event of failure of the web exposed to the pressurized fluid. To this end, the web not exposed to the pressure defines at least one aperture therethrough such that if the web exposed to the pressure fails, fluid pressure is relieved through the aperture so as to limit the rate of pressure relief.

The invention further provides such a load-bearing structure in the form of a pressure bulkhead for a pressurized compartment of an aircraft, the outer attachment structures being adapted to attach the bulkhead to fuselage structure of the aircraft. The bulkhead preferably includes intercostal members integrally fabricated with and projecting generally axially from one of the webs and corresponding outer attachment structure, the intercostal members serving to attach the bulkhead to the fuselage structure of the aircraft. In one embodiment, the bulkhead is adapted to be attached to fuselage structure with the first web facing into the pressurized compartment and the second web facing outward therefrom, and the second web defines the aperture for controlled pressure relief. Alternatively, the aperture can be defined in the first web. The web facing into the pressurized compartment preferably includes beams attached to the outer surface thereof for providing sites for attachment of aircraft systems and/or other structural items such as floor beams or brackets.

Advantageously, the stiffeners located between the webs include radial stiffeners that radiate outward from central regions of the webs toward the outer peripheries of the webs. The stiffeners preferably further include circumferential stiffeners that extend generally circumferentially between the radial stiffeners and collectively form at least one ring encircling the central regions of the webs.

The load-bearing structure of the invention can also take other forms. For example, in one embodiment, the structure is adapted to serve as a door for an aircraft, the outer attachment structures being adapted to attach the door to a door frame of the aircraft. Where the door is to be used in a pressurized compartment, one of the webs comprises an outer pressure web for supporting fluid pressure loading and the other web comprises an inner web and defines at least one aperture therethrough. Alternatively, the door can be fabricated as a non-pressurized door. As another example, the structure can be fabricated as a door surround structure for an aircraft, one of the webs comprising an inner web for facing into the aircraft and the other web comprising an outer web for facing out from the aircraft, each web defining a doorway opening bounded by an inner periphery of the web, with one or more apertures being defined in the inner web.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE DRAWINGS

Figure 1:
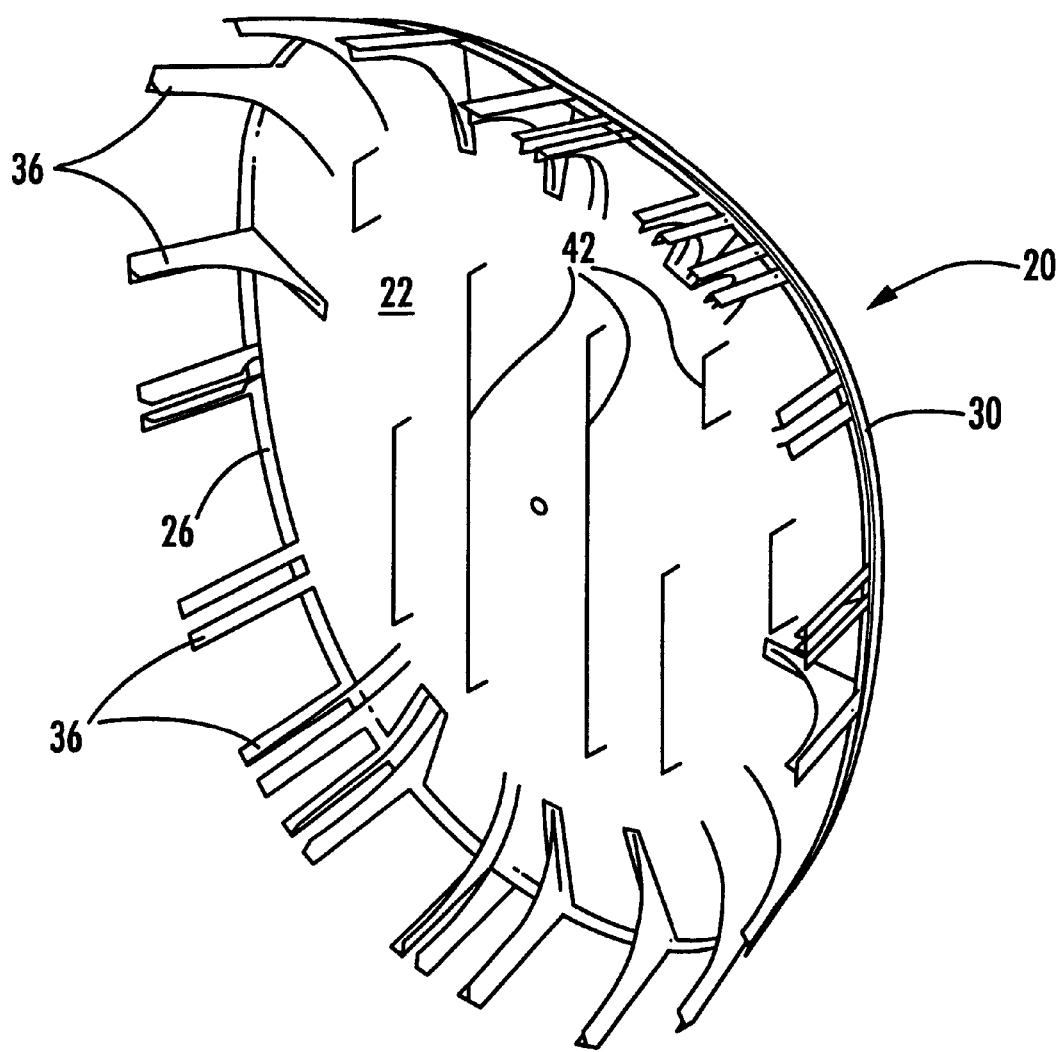
FIG. 1 is a perspective view, generally aft looking forward, of a pressure bulkhead for an aircraft in accordance with one preferred embodiment of the invention.
Figure 2:
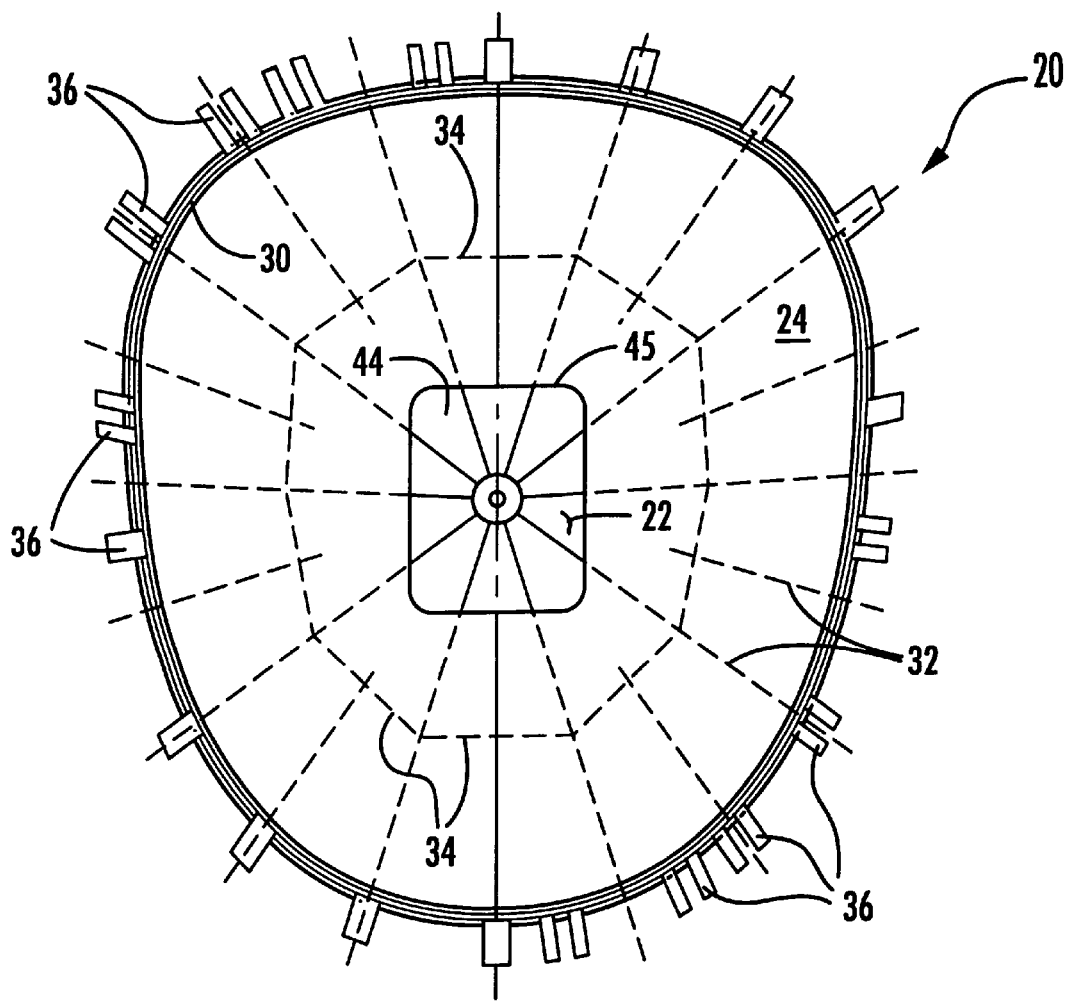
FIG. 2 is a front elevation of the bulkhead of FIG. 1, looking aft.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 1–5 relate to a first preferred embodiment of the invention in the form of a pressure bulkhead 20 for a pressurized compartment of an aircraft. The bulkhead 20 is configured to be used as a forward pressure bulkhead adjacent an unpressurized nose radome of an aircraft. The bulkhead 20 comprises an aft web 22 designed to withstand pressure loading when the aircraft compartment is pressurized relative to ambient air pressure outside the aircraft, and a redundant forward web 24 axially spaced from the aft web 22. An aft attachment ring 26 is fabricated on the outer periphery of the aft web 22, the aft ring 26 being adapted to be affixed to the skin 28 of the aircraft fuselage (FIG. 4), such as by fasteners (not shown). A forward attachment ring 30 is fabricated on the outer periphery of the forward web 24 and is likewise adapted to be affixed to the fuselage skin 28.

Figure 3:
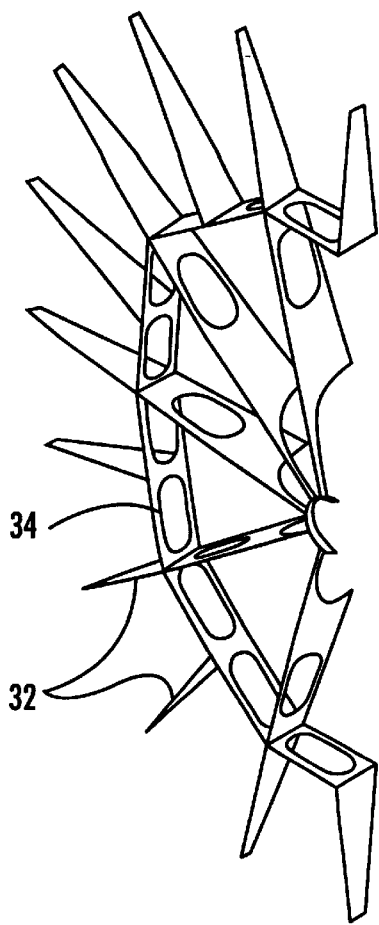
FIG. 3 is a fragmentary perspective view of the radial and circumferential stiffeners for the pressure bulkhead of FIG. 1.

The forward web 24 is connected to the aft web 22 by a plurality of elongate radial stiffeners 32 and circumferential stiffeners 34, shown in isolation in FIG. 3, which are disposed between the webs and joined to the opposing inner surfaces thereof. In accordance with the present invention, the stiffeners 32, 34 are fabricated integrally with at least one of the webs 22, 24 so as to form a one-piece monolithic structure. Additionally, each web 22, 24 preferably is fabricated integrally with its respective attachment ring 26, 30 such that the web and attachment ring comprise a one-piece monolithic structure. More preferably, the webs 22, 24, attachment rings 26, 30, and stiffeners 32, 34 are all integrally fabricated as a one-piece monolithic structure. Regardless of whether both webs 22, 24 are integrally fabricated, the monolithic structure provides alternate load paths in the event of failure of a structural feature.

Figure 4:
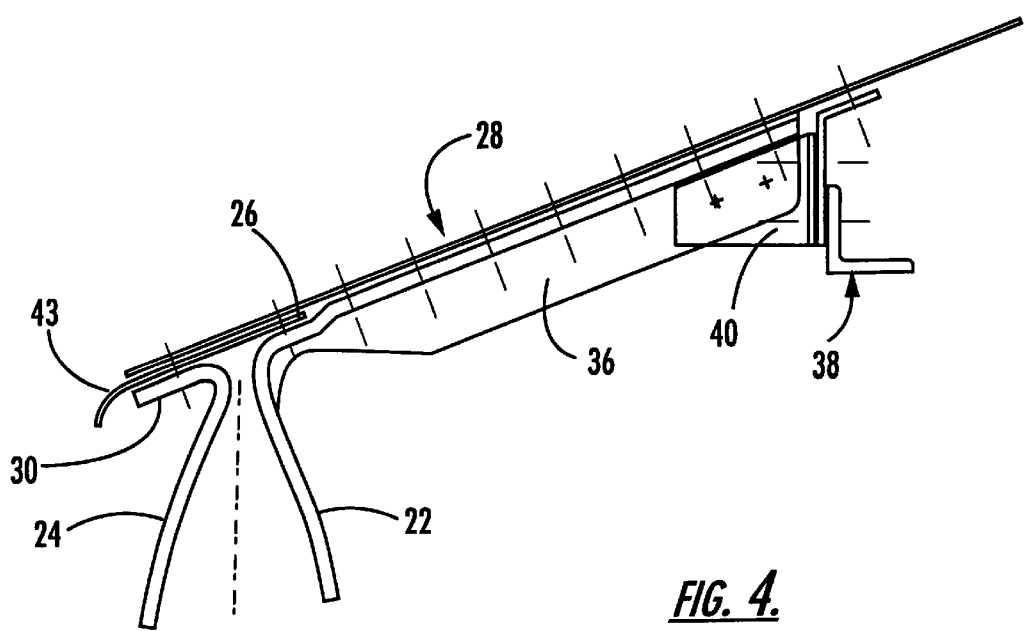
FIG. 4 is an axial-radial plane cross-sectional view of the attachment rings and intercostal flanges of the bulkhead of FIG. 1, showing the attachment rings and integral intercostal flanges attached to a fuselage skin.

The bulkhead 20 preferably also includes intercostal flanges 36 connected to the aft web 22 and aft attachment ring 26. The intercostal flanges 36 extend generally axially in an aft direction from the aft attachment ring 26 and are used for attaching the bulkhead 20 to existing auxiliary frame structure 38 of the aircraft located aft of the bulkhead, as shown in FIG. 4. Clips 40 are used for attaching the intercostal flanges 36 to the frame structure 38. The intercostal flanges 36 are also affixed to the fuselage skin 28, such as by fasteners (not shown, although suitable locations of fasteners are indicated by short double-dash line segments in FIG. 4). Preferably, the intercostal flanges 36 are fabricated integrally with the aft web 22 and aft attachment ring 26 as a one-piece monolithic structure. The aft web 22 preferably also has a plurality of attachment beams 42 affixed to its outer (aft-facing) surface for attaching various aircraft systems components and/or other structural items to the bulkhead 20. A fail-safe strap or ring 43, preferably forming an extension of a radome bulb seal depressor, advantageously is connected between the forward attachment ring 30 and the aft attachment ring 26 and connects the attachment rings to the fuselage skin 28. The fail-safe strap 43 may include portions that extend aft and are in alignment with the intercostal flanges 36 so as to provide fastener locations in common with those of the intercostal flanges 36.

The forward web 24 advantageously defines at least one opening or aperture 44 therethrough. A reinforcing flange 45 is fabricated about the perimeter of the aperture 44. When the aircraft compartment is pressurized, the aft web 22 is exposed to a pressure differential acting in the forward direction. The aft web 22 preferably is domed or convex in the aft direction, and thus the pressure loading on the aft web 22 places the aft web in compression. The forward web 24 is located outside the pressurized area of the aircraft and includes the aperture 44, and thus has an equal pressure loading on its opposite surfaces. The forward web 24 preferably is domed or convex in the forward direction. The pressure loads on the aft web 22, transferred through the stiffeners 32, 34, place the forward web 24 in tension, but the aft web 22 comprises the primary load-carrying web for the bulkhead 20. The forward web 24 is designed to be able to withstand at least the maximum non-pressure loads that could be experienced by the bulkhead 20 under a worst-case scenario.

In the event that the forward web 24 fails, the aft web 22 can carry the pressure load and other non-pressure loads exerted on the bulkhead. If the aft web 22 fails, pressure is relieved at a controlled rate through the aperture 44 in the forward web 24, thus preventing rapid decompression, and the non-pressure loads on the bulkhead are supported by the forward web 24. The aperture 44 also enables inspection of the inner surfaces of the aft web 22.

An alternative configuration (not illustrated) in accordance with the invention includes a forward pressure web and a redundant aft web perforated with holes that equal an area less than the calculated area for blow-out of the fuselage. In this case, if the forward web fails, the aft web would prevent rapid decompression through controlled release of pressure through the holes, and the aft web would support the non-pressure loads. If the aft web fails, the forward web carries the pressure and nonpressure loads exerted on the bulkhead.

Figure 5:
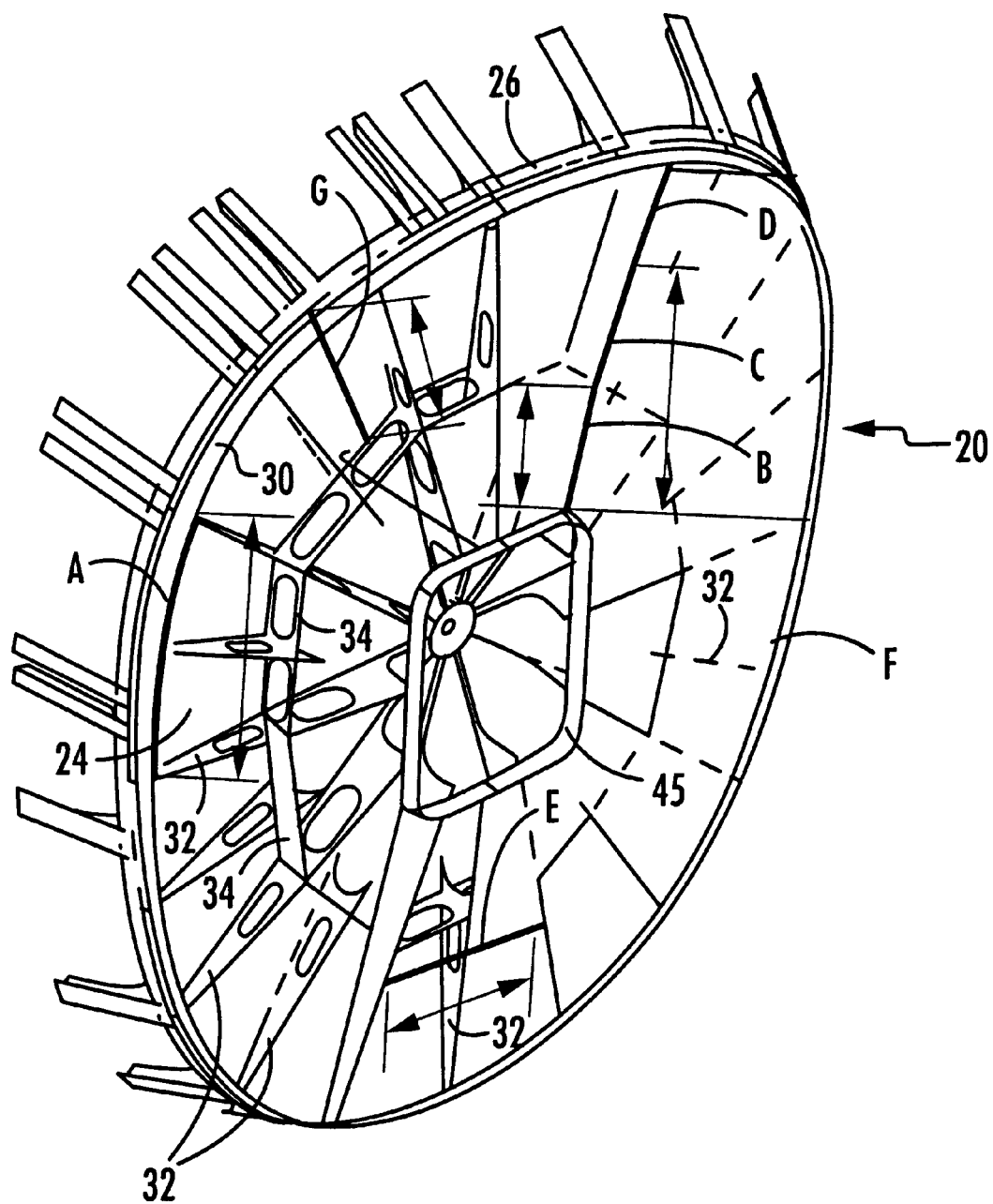
FIG. 5 is a perspective view, generally forward looking aft, of the bulkhead of FIG. 1, illustrating various cuts made in the bulkhead for a series of pressure-loading tests to simulate likely damage scenarios.

A forward pressure bulkhead representative of structure used on a 737-type aircraft, substantially corresponding to the bulkhead 20 described above, was constructed of aluminum alloy by a sand-casting technique and was subjected to a series of pressure-loading tests in which various portions of the bulkhead were intentionally cut to simulate cracking or damage in areas that were identified through finite-element analyses as likely locations for initiation of cracks and likely directions along which cracks might grow during use. The bulkhead was installed in structure representative of a 737 aircraft fuselage in a manner similar to that shown in FIG. 4. A series of seven damage simulations was administered to the bulkhead, and after each simulation, the bulkhead was loaded to the fail safe pressure of 10.3 psi. No repairs were made during the series of tests. FIG. 5 depicts the seven damage simulations that were performed, labeled A through G.

Damage A comprised a cut made through the forward web 24 separating the web 24 from the forward attachment ring 30 along a circumferential arc extending across two bays, a bay being defined as a portion of the web bounded between two adjacent radial stiffeners 32. Damage B comprised a radially extending cut made through the aperture flange 45 and through the forward web 24 outward to one of the circumferential stiffeners 34. Damage C comprised an extension of the cut B outward to a point about midway between the circumferential stiffener 34 and the forward attachment ring 30. Damage D comprised an extension of the cut C outward to the forward attachment ring 30. Damage E comprised a two-bay cut in the forward web 24 just outward of the circumferential stiffener 34 and also cutting through the radial stiffener 32 that separates the two bays. Damage F comprised a two-bay cut in the aft web 22 to separate the aft web from the aft attachment ring 26. Damage G comprised a radial cut in the aft web 22 from the aft attachment ring 26 inward to the circumferential stiffener 34.

The bulkhead successfully withstood the fail safe loading of 10.3 psi after each damage simulation, with no permanent deformation noted. After the final test, the test pressure was increased until destructive failure of the bulkhead occurred at a pressure of 21.1 psi, which exceeded the ultimate load pressure of 18.0 psi.

The monolithic structures of the invention advantageously can be fabricated by casting, for example, by sand casting or investment casting.

Figure 6:
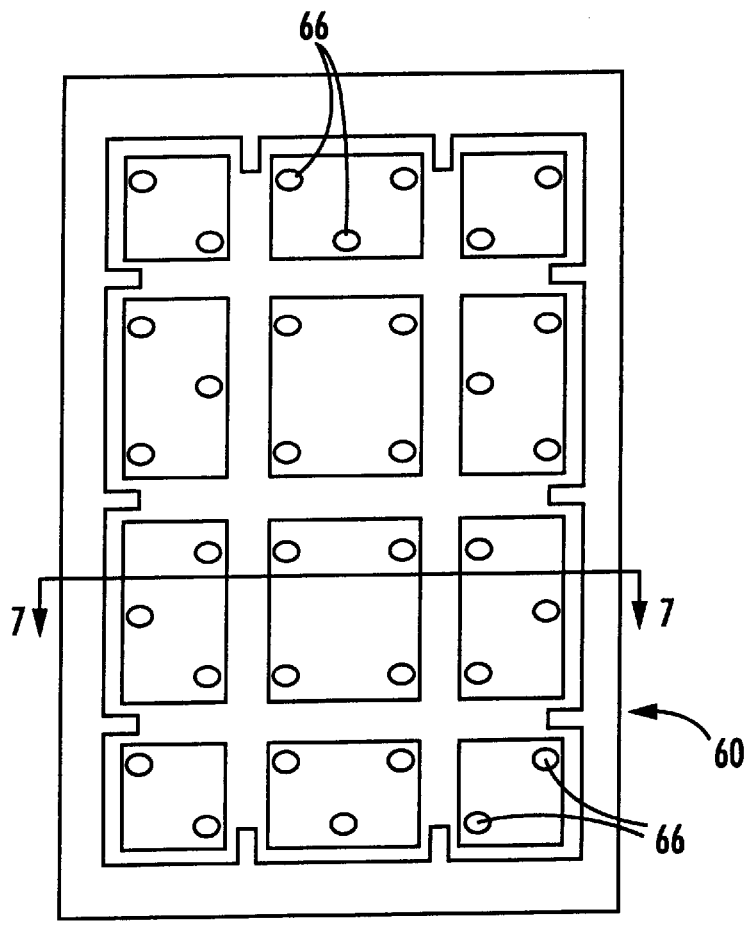
FIG. 6 is a front elevation of a pressurized door in accordance with another embodiment of the invention.
Figure 7:
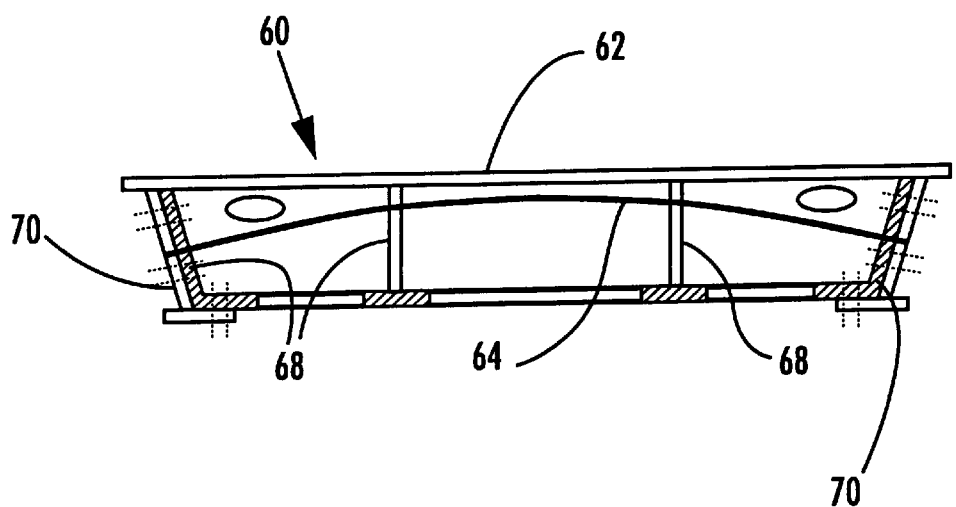
FIG. 7 is a cross-section along line 7—7 of FIG. 6.

The invention can be embodied in forms other than pressure bulkheads. For instance, FIGS. 6 and 7 depict a door 60 for a pressurized compartment of an aircraft. The door 60 includes an outer web or skin 62 for supporting pressure loading, an inner web 64 having apertures 66 defined therein, and stiffeners 68 connected between the outer and inner webs and also extending inward of the inner web. The stiffeners 68 comprise T-shaped beams extending along length and width directions of the door and forming a rectangular grid structure. The inner web 64 and the stiffeners 68 are fabricated together as a one-piece monolithic structure. The outer web 62 can be fabricated as part of that monolithic structure, or alternatively can be fabricated separately and then attached (e.g., by welding or other suitable method) to the outer sides of the stiffeners 68. The door 60 preferably also includes door stop fittings 70 attached to the inner sides of the stiffeners 68 and attached along the sides of the door connecting to both the inner web 64 and outer web 62.

Figure 8:
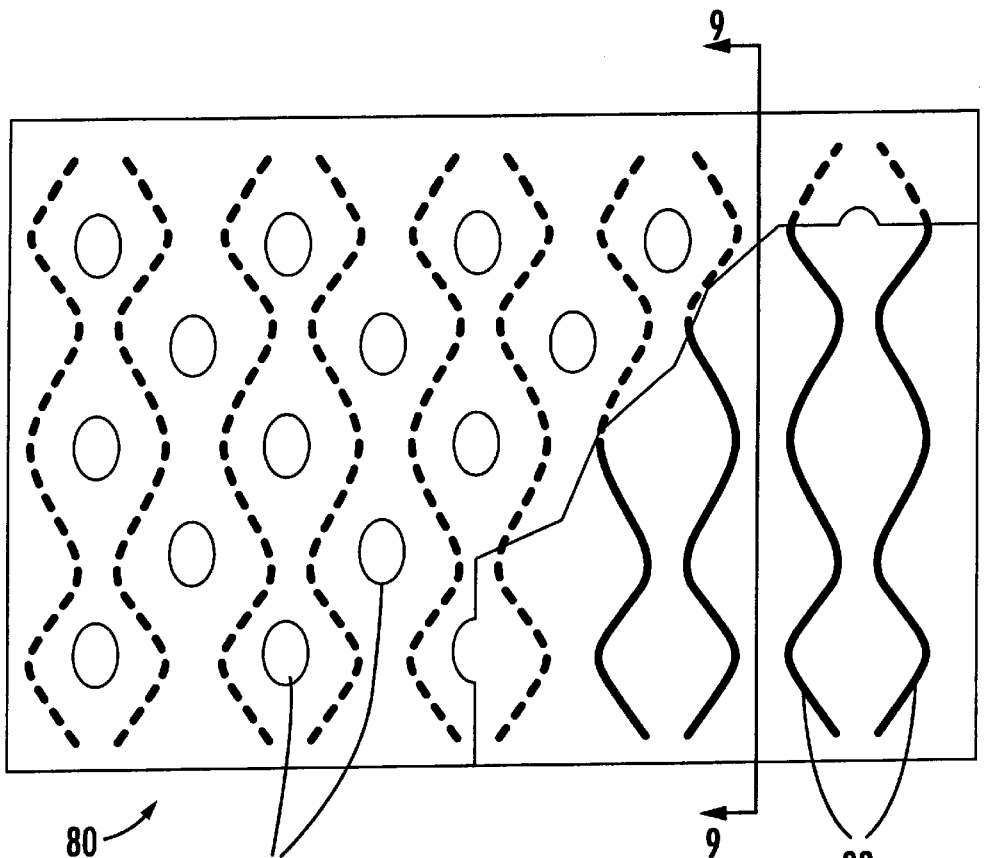
FIG. 8 is a front elevation of a non-pressurized door in accordance with a further embodiment of the invention.
Figure 9:
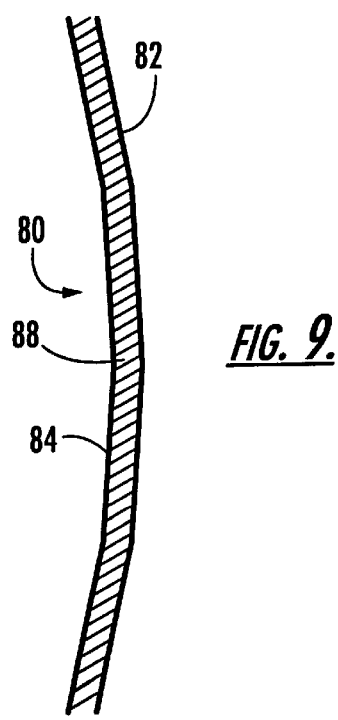
FIG. 9 is a cross-section along line 9—9 of FIG. 8.

Another embodiment of the invention is shown in FIGS. 8 and 9 in the form of a non-pressurized door 80. The door 80 has an outer web 82, an inner web 84 perforated by apertures 86, and stiffeners 88 connecting the inner and outer webs.

The inner web 84 and stiffeners 88 are fabricated together as a one-piece monolithic structure. The outer web 82 can be fabricated integrally as part of that monolithic structure, or can be separately fabricated and then attached to outer sides of the stiffeners 88.

Figure 10:
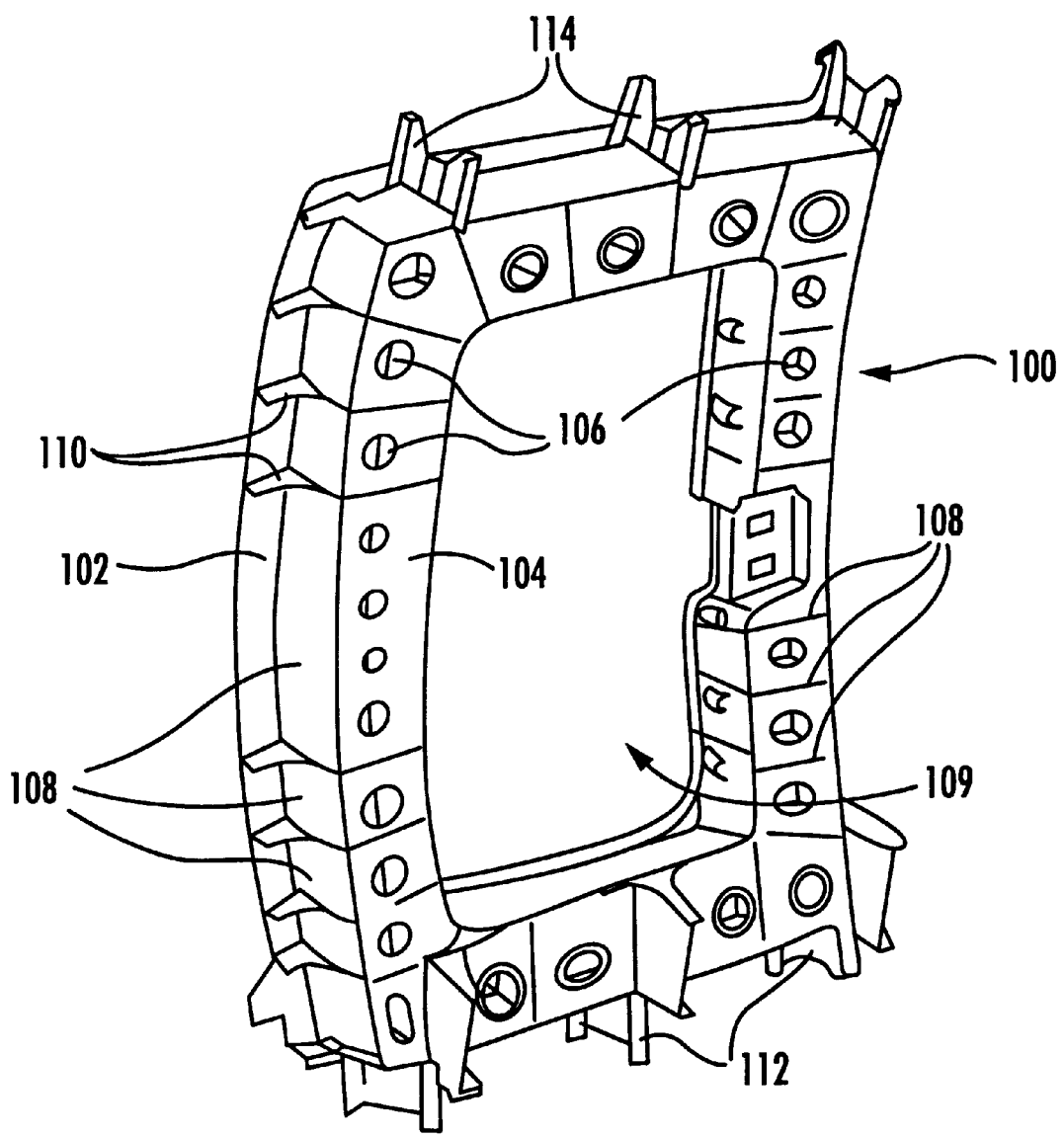
FIG. 10 is a perspective view of a door surround structure in accordance with yet another embodiment of the invention.

A still further embodiment of the invention is shown in FIG. 10 in the form of a door surround structure 100. The door surround structure 100 includes an outer web 102, an inner web 104 perforated by apertures 106, and plate-shaped stiffeners 108 connecting the inner and outer webs. The webs define a doorway opening 109 that is closed in flight by a door (not shown). The stiffeners 108 divide the door surround structure 100 into a plurality of box-shaped elements each having an aperture 106. The inner web 104 and stiffeners 108 are fabricated together as a one-piece monolithic structure. The outer web 102 can be fabricated integrally as part of that monolithic structure, or can be separately fabricated and then attached to outer sides of the stiffeners 108. The structure 100 includes integral intercostal attachment flanges 110 along its opposite vertical side edges for attachment to adjacent frame sections of the fuselage. Additional attachment flanges 112 are provided along the lower horizontal edge of the structure for connecting to floor beams of the aircraft, and flanges 114 are provided along the upper horizontal edge for connecting to ceiling beams. Failure of an element along the inner periphery of the structure 100 is accommodated by transfer of load to a similar feature at the outer periphery.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A load-bearing structure for forming a portion of a boundary on which fluid pressure is exerted, the structure having redundant load paths and comprising:
    a first web having opposite surfaces and an outer periphery;
    a first outer attachment structure attached to the outer periphery of the first web;
    a redundant second web having opposite surfaces and an outer periphery, the first and second webs being spaced apart with one of said surfaces of the first web opposing one of said surfaces of the second web;
    a second outer attachment structure attached to the outer periphery of the second web; and
    stiffeners disposed between the first and second webs and attached to the opposing surfaces thereof,
    the stiffeners being fabricated with at least one of the webs and the attachment structure associated therewith as a monolithic part;
    the first and second outer attachment structures being adapted to affix the load-bearing structure to a further structure of said boundary, whereby the load-bearing structure defines multiple load paths from the webs to said further structure.

2. The load-bearing structure of claim 1, wherein one of the webs defines at least one aperture therethrough such that if the other web fails, fluid pressure acting on the other web is relieved through said aperture so as to limit the rate of pressure relief.

3. The load-bearing structure of claim 2, fabricated as a pressure bulkhead for a pressurized compartment of an aircraft, the outer attachment structures being adapted to attach the bulkhead to fuselage structure of the aircraft.

4. The load-bearing structure of claim 3, further comprising intercostal members integrally fabricated with and projecting generally axially from one of the webs and corresponding outer attachment structure, the intercostal members serving to attach the load-bearing structure to the fuselage structure of the aircraft.

5. The load-bearing structure of claim 3, wherein the load-bearing structure is adapted to be attached to fuselage structure with the first web facing into the pressurized compartment and the second web facing outward therefrom, and wherein the second web defines the aperture for controlled pressure relief.

6. The load-bearing structure of claim 5, wherein the surface of the first web facing into the compartment includes beams attached thereto for providing sites for attachment of other items to the structure.

7. The load-bearing structure of claim 3, wherein the load-bearing structure is adapted to be attached to fuselage structure with the first web facing into the pressurized compartment and the second web facing outward therefrom, and wherein the first web defines the aperture for controlled pressure relief.

8. The load-bearing structure of claim 1, wherein the stiffeners include radial stiffeners that radiate outward from central regions of the webs toward the outer peripheries of the webs.

9. The load-bearing structure of claim 8, wherein the stiffeners further include circumferential stiffeners that extend generally circumferentially between the radial stiffeners and collectively form at least one ring encircling the central regions of the webs.

10. The load-bearing structure of claim 9, wherein one of the webs defines a central aperture therethrough.

11. A pressure bulkhead for attachment to fuselage structure of an aircraft so as to bound one end of a pressurized compartment, comprising:

a forward web having opposite surfaces bounded by an outer periphery of the forward web;

a forward attachment ring connected to the outer periphery of the forward web, the forward web and forward attachment ring being integrally formed as a one-piece structure, the forward attachment ring being adapted to be attached to inner surfaces of the fuselage structure;

an aft web having opposite surfaces bounded by an outer periphery of the aft web;

an aft attachment ring connected to the outer periphery of the aft web, the aft web and aft attachment ring being integrally fabricated as a one-piece structure, the aft attachment ring being adapted to be attached to inner surfaces of the fuselage structure with the aft web axially spaced from the forward web; and elongate stiffeners disposed between the forward and aft webs and attached to opposing surfaces thereof;

the stiffeners being integrally fabricated with at least one of the forward and aft webs as an integral one-piece structure, whereby the bulkhead provides multiple load paths from the webs to the fuselage structure.

12. The bulkhead of claim 11, wherein one of the forward and aft webs defines an aperture therethrough, the aperture being sized to allow pressure within the aircraft compartment to be relieved in the event of failure of the other web.

13. The bulkhead of claim 11, wherein the stiffeners, the forward web, and the aft web are integrally fabricated as a one-piece structure.

14. The bulkhead of claim 11, wherein the stiffeners include radial stiffeners that radiate outward from central regions of the webs toward the attachment rings.

15. The bulkhead of claim 14, wherein the stiffeners further include circumferential stiffeners extending between the radial stiffeners.

16. The bulkhead of claim 11 further comprising intercostal members integrally fabricated with and projecting generally axially from one of the webs and corresponding attachment ring, the intercostal members being adapted to attach the bulkhead to the fuselage structure of the aircraft.

* * * * *